S. F. WILCOX.
TIRE ARMOR.
APPLICATION FILED MAR. 20, 1912.
1,062,070.
Patented May 20, 1913.
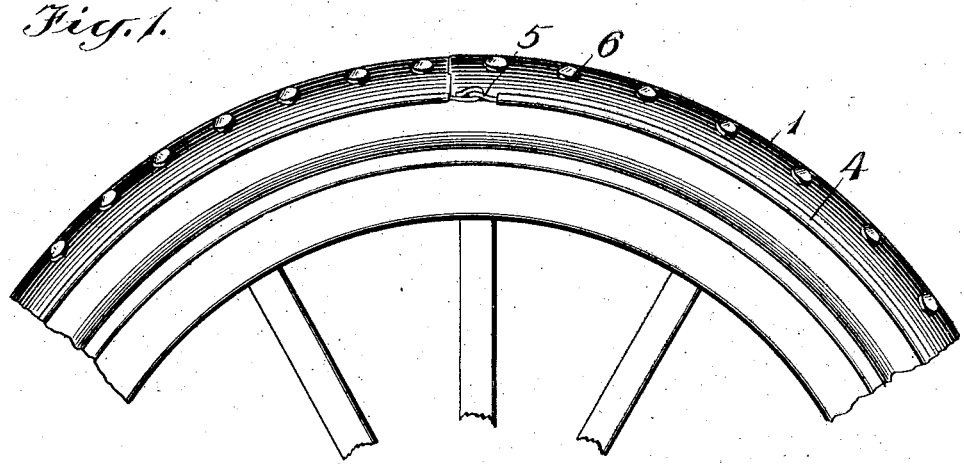
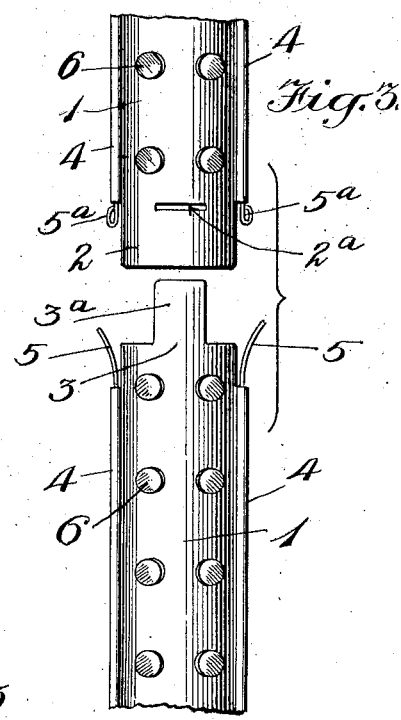
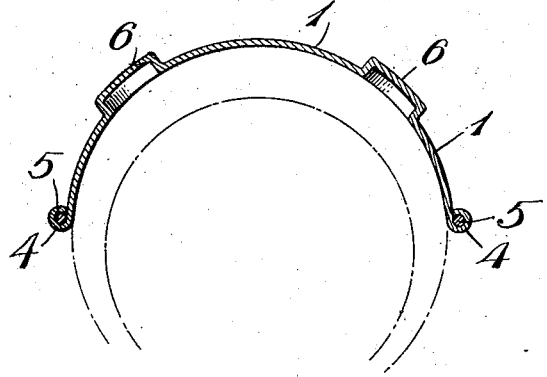
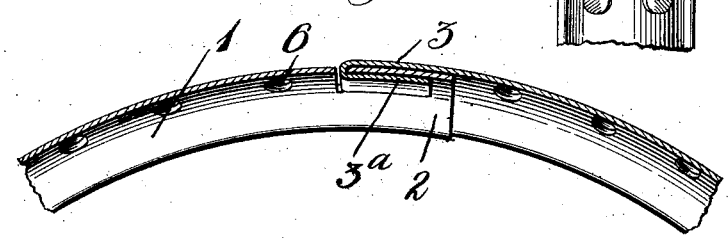
Witnesses:
Chas A Peard
Ida M Hunziker
Inventor
S. F. Wilcox
By his Attorneys

# UNITED STATES PATENT OFFICE.

SIDNEY F. WILCOX, OF GARDEN CITY, NEW YORK.

TIRE-ARMOR.

1,062,070.

Specification of Letters Patent.  Patented May 20, 1913.

Application filed March 20, 1912. Serial No. 684,934.

*To all whom it may concern:*

Be it known that I, SIDNEY F. WILCOX, a citizen of the United States, residing at Garden City, Nassau county, State of New York, have invented certain new and useful Improvements in Tire-Armors, of which the following is a full, clear, and exact description.

This invention relates to an armor for pneumatic and other tires, and in its broad aspect, comprises an integral sheet metal casing concaved to the shape of a tire tread and provided with means to prevent "creeping" and "skidding," and with means for fastening together the adjacent ends of the casing.

A preferable embodiment of the invention is illustrated in the accompanying drawings, in which, Figure 1 is a view in elevation of part of a wheel and tire equipped with the armor forming the subject matter of my invention. Fig. 2 is a transverse section through the tire armor, the position of the tire being indicated in dotted lines. Fig. 3 is a plan view of the interlocking ends of the armor detached. Fig. 4 is a longitudinal section through the tire armor at the point of overlapping interlocking engagement of its ends.

Referring to the drawings by numerals: 1 indicates an integral annular casing of flexible sheet metal concaved to the shape of a tire tread and having overlapping ends 2—3, the end portion 2 being provided with a transverse slot $2^a$, and the end portion 3 having projecting therefrom a tongue member $3^a$ adapted to be inserted through the slot $2^a$ and bent upwardly against the under surface of the casing when the ends of the tire are overlapped. The casing 1 at its lower edges is formed with inturned flanges 4 within which are seated fastening wires 5 whose ends, when the ends of the tire are overlapped and locked as hereinbefore recited, are adapted to be fastened together in any suitable manner. A loop or eye $5^a$ may be formed at the ends of the wires at one end of the casing, and the ends of the wires at the adjacent end may be inserted therethrough and twisted, or the wires may be secured together in any other suitable manner.

It will be noted that the flanges 4 terminate a short distance from the ends 2 and 3 of the casing to allow for the overlapping of the ends. By reason of the clearance thus afforded and of the length of the tongue $3^a$, which may be varied, the casing or armor may be adapted to tires of different sizes within certain limits the flexibility of the material permitting the tire armor to conform to different cross-sectional areas within limits. Furthermore, the metal of the casing, being comparatively thin, the bulge at the point of overlap is not appreciable and will not materially interfere with the efficiency and smooth operation of the casing as an armor for the tire.

In order to give a non-skid surface to the tread of the casing, I form therein, by punching or any other suitable means, hollow projections 6 which may be arranged about the tread surface of the casing in any desired manner, either in staggered relation, transverse parallel relation, or in any other manner which may seem desirable. These projections, in addition to forming a non-skid tread surface, will also tend to prevent "creeping" of the armor about the tire inasmuch as the tread surface of the tire will be slightly compressed within these hollow projections, which will also tend to act as suction cups to retain the casing upon the tire in the position in which it was originally placed thereon. I might also state that while I have shown a single tongue and slot, $3^a$ and $2^a$ respectively, for interconnecting the overlapping ends of the tire casing, this arrangement may be varied somewhat as, for instance, by using a plurality of projecting tongues and coöperating slots.

In practice, the tire is deflated somewhat and the armor casing of my invention placed thereabout and its tongue or tongues inserted through the corresponding slot or slots and bent backwardly to interlock the ends of the casing. The tire is then fully inflated, and as the casing is made or adjusted to fit an inflated tire of the size used, the inflation of the tire will, of itself, lock or hold the casing thereon. The ends of the binding wires 5 may be locked together, either before or after the tire is inflated and by any suitable means, as has been heretofore pointed out.

While I have described a specific embodiment of my invention, various modifications thereof are possible within the spirit of the invention and of the appended claim.

What I claim, therefore, and desire to secure by Letters Patent, is:

A tire armor comprising an integral annular casing of flexible sheet metal concaved to the shape of a tire tread, having overlapping ends, and having a slot formed adjacent one end thereof and a tongue projecting from the other end thereof adapted to be inserted through said slot and bent to lock the overlapping ends of the casing together, said tongue being of such length as to afford adjustment means for varying the circumferential size of the tire armor; inturned flanges formed at the lower edges of the annular casing terminating adjacent the point of greatest overlap of the ends thereof; and binding wires inclosed within and carried by said flanges and adapted to be interlocked at their abutting ends.

SIDNEY F. WILCOX.

Witnesses:
 E. E. MORSE,
 HENDERSON F. HILL.